US007662042B2

(12) United States Patent
Oswald

(10) Patent No.: US 7,662,042 B2
(45) Date of Patent: Feb. 16, 2010

(54) ADJUSTABLE VIDEO GAME COCKPIT

(76) Inventor: George Joseph Oswald, 3323 Coolidge Ave., Los Angeles, CA (US) 90066

( * ) Notice: Subject to any disclaimer, the term of this patent is extended or adjusted under 35 U.S.C. 154(b) by 349 days.

(21) Appl. No.: 10/758,914

(22) Filed: Jan. 16, 2004

(65) Prior Publication Data

US 2005/0159219 A1  Jul. 21, 2005

(51) Int. Cl.
 *A63F 13/00* (2006.01)
(52) U.S. Cl. ............................. 463/46; 434/29; 434/30; 434/62; 463/30; 463/31; 463/36; 463/37; 463/38; 463/47; 446/7; 446/230; 472/130
(58) Field of Classification Search .................. 434/29, 434/30, 62; 463/30, 31, 36, 37, 38, 46, 47; 446/7, 230; 472/130
See application file for complete search history.

(56) References Cited

U.S. PATENT DOCUMENTS

| | | | | |
|---|---|---|---|---|
| 1,367,908 | A * | 2/1921 | Karschitz | 297/35 |
| 4,639,007 | A * | 1/1987 | Lawrence | 280/234 |
| 5,431,569 | A * | 7/1995 | Simpkins et al. | 434/29 |
| D376,186 | S | 12/1996 | Penney | D21/250 |
| 5,951,018 | A * | 9/1999 | Mamitsu | 273/442 |
| 5,992,809 | A * | 11/1999 | Sweere et al. | 248/278.1 |
| 6,083,106 | A * | 7/2000 | McDowell | 463/46 |
| 6,102,476 | A * | 8/2000 | May et al. | 297/217.3 |
| 6,142,877 | A * | 11/2000 | Nishimura | 463/46 |
| D446,263 | S | 8/2001 | Heys | D21/477 |
| 6,315,358 | B1 * | 11/2001 | Baru | 297/170 |
| 6,851,950 | B1 * | 2/2005 | Gamnig | 434/45 |
| 2002/0011374 | A1* | 1/2002 | Brister | 180/291 |
| 2002/0163164 | A1* | 11/2002 | Shapiro et al. | 280/651 |
| 2004/0016588 | A1* | 1/2004 | Vitale et al. | 180/322 |
| 2004/0129489 | A1* | 7/2004 | Brasseal et al. | 180/350 |
| 2004/0154854 | A1* | 8/2004 | Stephens | 180/291 |
| 2004/0155493 | A1* | 8/2004 | Baru | 297/188.2 |
| 2004/0254020 | A1* | 12/2004 | Dragusin | 463/46 |
| 2005/0009611 | A1* | 1/2005 | Masaya et al. | 463/46 |
| 2005/0132939 | A1* | 6/2005 | McClellion | 108/92 |

FOREIGN PATENT DOCUMENTS

FR  2620402 A1 * 3/1989
GB  2389319 A  * 12/2003

OTHER PUBLICATIONS

Internet Website, Virtual Racing Simulators.
Internet Website, Racing Simulators.com.
Internet Website, Race Rig.
Internet Website, VRX Industries Ltd.
Internet Webske, Thinkertoys.

* cited by examiner

*Primary Examiner*—Xuan M Thai
*Assistant Examiner*—Kang Hu
(74) *Attorney, Agent, or Firm*—Holland & Hart

(57) ABSTRACT

An adjustable video game cockpit that facilitates a number of independent adjustments to accommodate users of all sizes. The video game cockpit may include a video monitor stand and a universal video game console mount. The inclusion of the video monitor stand and universal video game console permit the cockpit to operate as a single gaming unit. The video game cockpit collapses down to a low profile for convenient relocation and storage.

20 Claims, 6 Drawing Sheets

ADJUSTABLE VIDEO GAME COCKPIT

FIELD OF THE INVENTION

The present invention relates to cockpit structures, and, more particularly, to an adjustable cockpit structure for video game simulation.

BACKGROUND OF THE INVENTION

The video game industry has expanded over the years to include large segments of the general population. Among the most popular products in the video game industry are games that simulate racing and flying. Some games are focused directly on racing or flying, and others include ancillary vehicle piloting. Some video game consoles thus include piloting components in addition to a standard game controller, mouse, or keyboard. For example, some video consoles are available with foot pedals, steering wheels, flight sticks, and other accessories. As video games have become more sophisticated, the demand for more realistic environments in which to operate them has also increased.

Typically, video games that incorporate a racing or flying aspect are operated using a hand-held controller. When users elect to add additional components such as foot pedals and steering wheels, often the additional components are simply set on the floor or a table. The user generally sits at the table in a kitchen or computer chair with the pedals at his feet. While sitting at a table and operating a steering wheel and foot pedals may add to the simulation experience, there is much room for improvement.

Therefore, there has been some development of portable video game simulation cockpits intended to more closely mimic a driving or flying position. For example, design patent numbers D376,186 and D446,263 illustrate two prior race car simulation cockpits. However, traditional race car simulation cockpits are tailored only to certain users. Typical race car simulation cockpits are not adjustable to accommodate users of various size. At best, some race car simulation cockpits may allow for sliding adjustment of a seat forward and back, but no other adjustments are available. Moreover, traditional race car simulation cockpits do not provide an integral adjustable monitor stand and they are bulky and difficult to transport and store.

In addition, prior race car simulation cockpits are not adaptable for use with all of the multiple video gaming platforms currently available. Race car simulation cockpits are typically designed for use with certain video game platforms, but not with others. For example, one race car simulation cockpit may be designed for use with a NINTENDO game system, but not with a personal computer or a MACINTOSH.

SUMMARY OF THE INVENTION

In one of many possible embodiments, the present invention provides a video game cockpit. The video game cockpit includes a support apparatus and a seat. The support apparatus comprises an adjustable pedal mount, an adjustable controller mount, and an adjustable monitor stand. The adjustable pedal and controller mounts may comprise platforms that are four-way or six-way adjustable. The adjustable pedal and controller mounts provide customized use of the video game cockpit for users of all sizes. The support apparatus may also include a game console mount. The game console mount is used to hold any game console, including a personal computer. The support apparatus may also include a keyboard mounting arm for holding a computer keyboard.

According to some embodiments, the support apparatus is removable from the seat. The support apparatus is also collapsible to a low profile to facilitate transport and storage.

The foregoing and other features, utilities and advantages of the invention will be apparent from the following more particular description of preferred embodiments of the invention as illustrated in the accompanying drawings.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

Throughout the drawings, identical reference numbers designate similar, but not necessarily identical, elements.

DETAILED DESCRIPTION

As mentioned above, some of the most popular products in the video game industry are games that simulate racing and flying. Some games are focused directly on racing or flying, while others include ancillary vehicle piloting. Games that include a piloting aspect are often operable with additional accessories such as steering wheels and pedals. While the accessories can be used with something as simple as a table and chair, the gaming experience can be significantly enhanced by providing a video game cockpit that allows operators to use the accessories in more realistic positions. The present invention describes methods and apparatus for enhancing video game experiences. The methods and apparatus are particularly useful with video games that include a piloting aspect, but the methods and apparatus may also be used with any other video game. The principles described herein may be used to enhance any video game using any video game system. Therefore, while the description below is directed primarily to certain accessories used for racing games, the methods and apparatus are not so limited.

As used throughout the claims and specification, the term "video game console" is used broadly to encompass any video game platform including, but not limited to: PLAYSTATION, PLAYSTATION 2, X-BOX, NINTENDO GAME CUBE, and personal computers (including MACINTOSH). The term "video game" is also used broadly to mean an electronic or computerized game played by manipulating images on a video display or television monitor. A "monitor" means a video display and includes a television set. A "cockpit" refers to a driver or pilot's compartment. The words "having" and "including" have the same meaning as the word "comprising."

Figure 1:
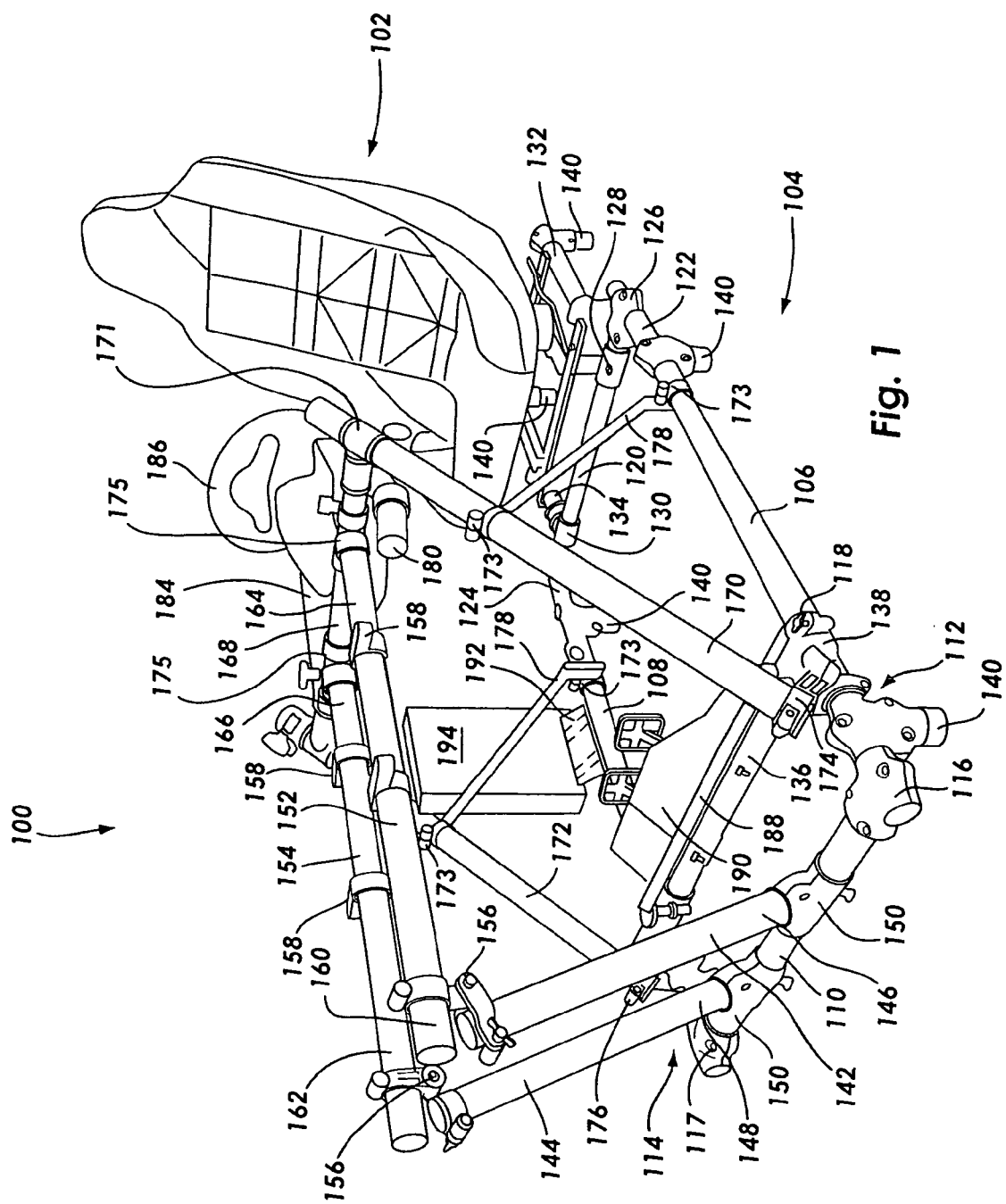
FIG. 1 is a perspective view of a video game cockpit assembly according to one embodiment of the present invention.

Referring now to the drawings, and in particular to FIG. 1, a simulation apparatus, for example a video game cockpit 100, is shown according to one embodiment of the present invention. As shown in FIG. 1, the video game cockpit 100 includes a seat or chair 102 connected to a cage or support apparatus 104. The support apparatus 104 comprises a plurality of interconnected tubular members, preferably made of plastic or other lightweight materials. However, according to some embodiments the interconnected tubular members may be made of metal or any other suitable material known to those skilled in the art.

The support apparatus 104 includes first and second side members 106, 108 spaced from one another. The first and second side members 106, 108 are preferably generally parallel to one another. A first nose cross-member 110 attaches transversely between a first end 112 of the first side member 106 and a first end 114 of the second side member 108. A first coupling 116 receives and attaches the first end 112 of the first side member 106 to the first nose cross-member 110. A second similar or identical coupling 117 receives and attaches the first end 114 of the second side member 108 to the first nose cross-member 110.

A chair cross-member 120 attaches transversely between a second end 122 of the first side member 106 and a second end 124 of the second side member 108. A chair cross-member coupling 126 attaches the second end 122 of the first side member 106 to the chair cross-member 120, and a second identical coupling (not shown in FIG. 1) attaches the second end 124 of the second side member 108 to the chair cross-member 120. First and second chair couplings 128, 130 are mounted to the chair cross-member 120 and are shown connected to first and second chair support members 132, 134. The first and second chair support members 132, 134 are connected to the chair 102, and allow the chair to be quickly and easily attached or detached from the support structure 104.

Similar to the attachment of the first nose cross-member 110 to the first and second side members 106, 108, a second nose cross-member 136 attaches transversely between the first and second side members 106, 108 at a variable spacing between the first nose cross-member 110 and the chair cross-member 120. An adjustable coupling 138 attaches the first side member 106 to the second nose cross-member 136, and a second identical coupling (not shown in FIG. 1) attaches the second side member 108 to the second nose cross-member 136. According to some embodiments, the adjustable couplings 138 are C-clamps that are sized to receive the first and second side members 106, 108. The adjustable couplings 138 include an adjuster 118 that selectively loosens and tightens the engagement between the adjustable couplings 138 and the first and second side members 106, 108 such that the second nose cross-member 136 may slide along the first and second side members 106, 108 and be secured thereto in any number of positions, but at least three positions. The second nose cross-member 136 supports an adjustable pedal mount or pedal platform 188. As shown in FIG. 1, the adjustable pedal platform 188 has a pedal module 190 mounted thereto. The adjustable pedal platform 188 is shown and described in more detail below with reference to FIG. 2.

A plurality of feet 140 are mounted to the first and second side members 106, 108 as shown in FIG. 1. According to FIG. 1, feet 140 are mounted to the first and second side members 106, 108 between the first and second nose cross-members 110, 136, and feet 140 are mounted at second ends 122, 124 of the first and second side members 106, 108. The feet 140 hold the support apparatus 104 above a support surface. The chair 102 also includes a plurality of feet 140. The feet 140 are adjustable along their respective mounts according to some embodiments to facilitate changes in weight distribution as desired.

The support apparatus 104 includes first and second angled members 142, 144 attached to and extending upward from the first nose cross-member 110. First ends 146, 148 of each of the first and second angled members 142, 144 are attached to the first nose cross-member 110 via couplings 150. The first and second angled members 142, 144 are generally parallel to one another and spaced from one another by a distance less than the spacing between the first and second side members 106, 108.

The first and second angled members 142, 144 attach opposite of the first nose cross-member 110 to first and second upper members 152, 154, respectively. Respective pivoting mounts 156 attach each of the first and second upper members 152, 154 to the first and second angled members 142, 144. As shown in FIG. 1 the first and second upper members 152, 154 are generally parallel to one another and parallel to the first and second side members 106, 108. The first and second upper members 152, 154 are spaced above the first and second side members 106, 108 and are arranged interior relative to the first and second side members 106, 108. The first and second upper members 152, 154 may include one or more pads 158. As shown in FIG. 1, there are four pads, two pads 158 attached to the first upper member 152 and two pads 158 attached to the second upper member 154. The pads 158 provide a convenient place to set a monitor or television for viewing a video game. Therefore, the first and second upper members 152 further comprise a monitor stand. In addition, as shown in FIG. 4 below, the pads 158 may support and/or attach a platform 185 to accommodate monitors of any size and shape.

The first and second upper members 152, 154 are supported at first ends 160, 162 by the first and second angled members 142, 144. Second ends 164, 166 of the first and second upper members 152, 154 are supported by a second cross-member 168 attached between third and fourth angled members 170, 172. The second ends 164, 166 of the first and second upper members 152, 154 are attached to the second cross-member 168 by T-couplings 175.

The third angled member 170 extends from a coupling 171 at the second cross-member 168 down to a pivot mount 174 connected to the first side member 106. Similarly, the fourth angled ember 172 extends from the second cross-member 168 down to a second pivot mount 176 connected to the second side member 108. Braces 178 movably extend between the first side member 106 and the third angled member 170, and between the second side member 108 and the fourth angled member 172 to support the positioning of the third and fourth angled members 170, 172. The braces 178 are preferably solid, flat support rods, but may be tubular material. The attachment of the braces 178 to the first and second side members 106, 108 and to the third and fourth angled members 170, 172 is facilitated by adjustable C-clamps 173 shown in FIG. 1.

Figure 3:
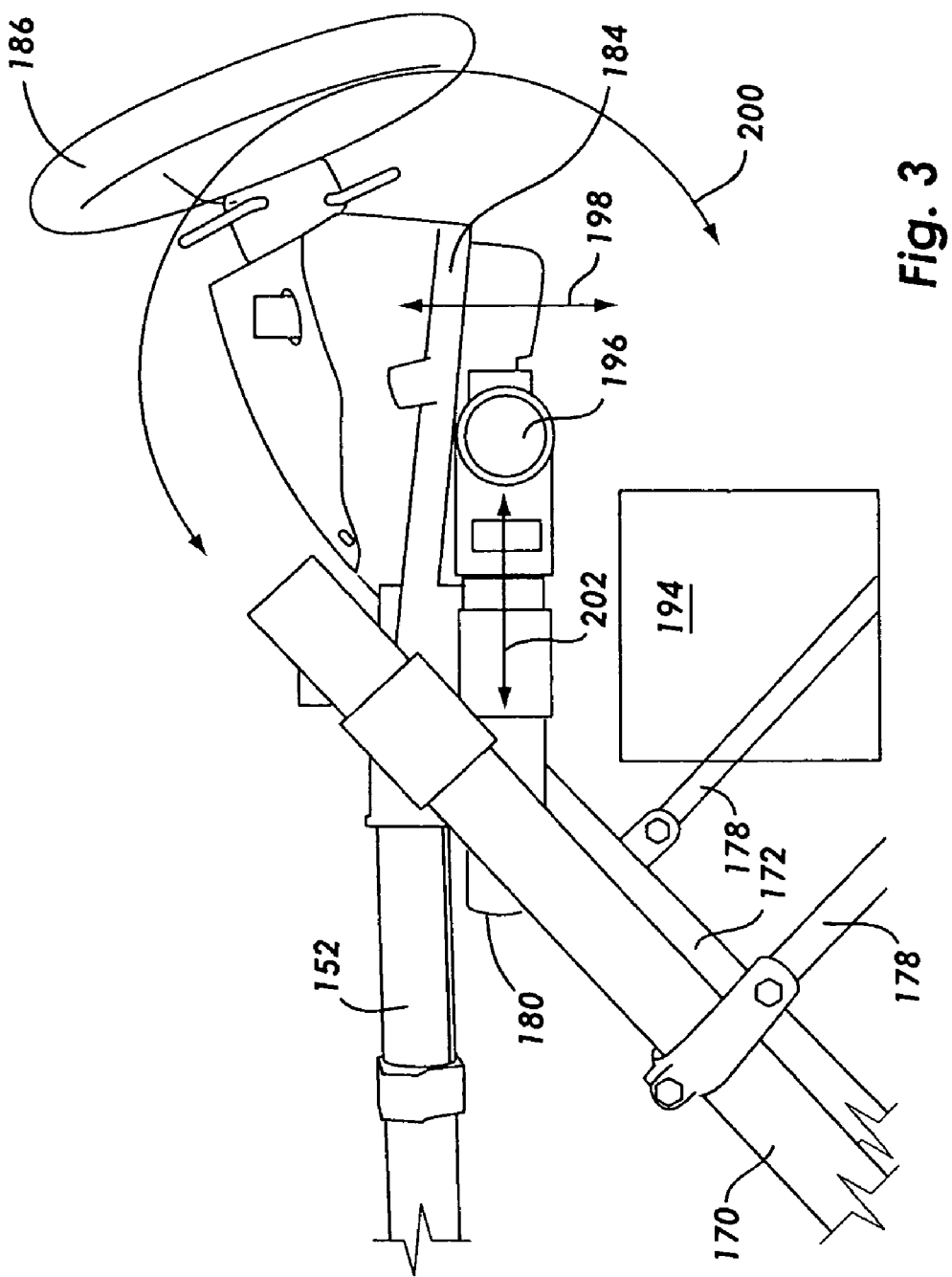
FIG. 3 is an enlarged side elevation view of a controller mount of the video game cockpit assembly of FIG. 1.
Figure 4:
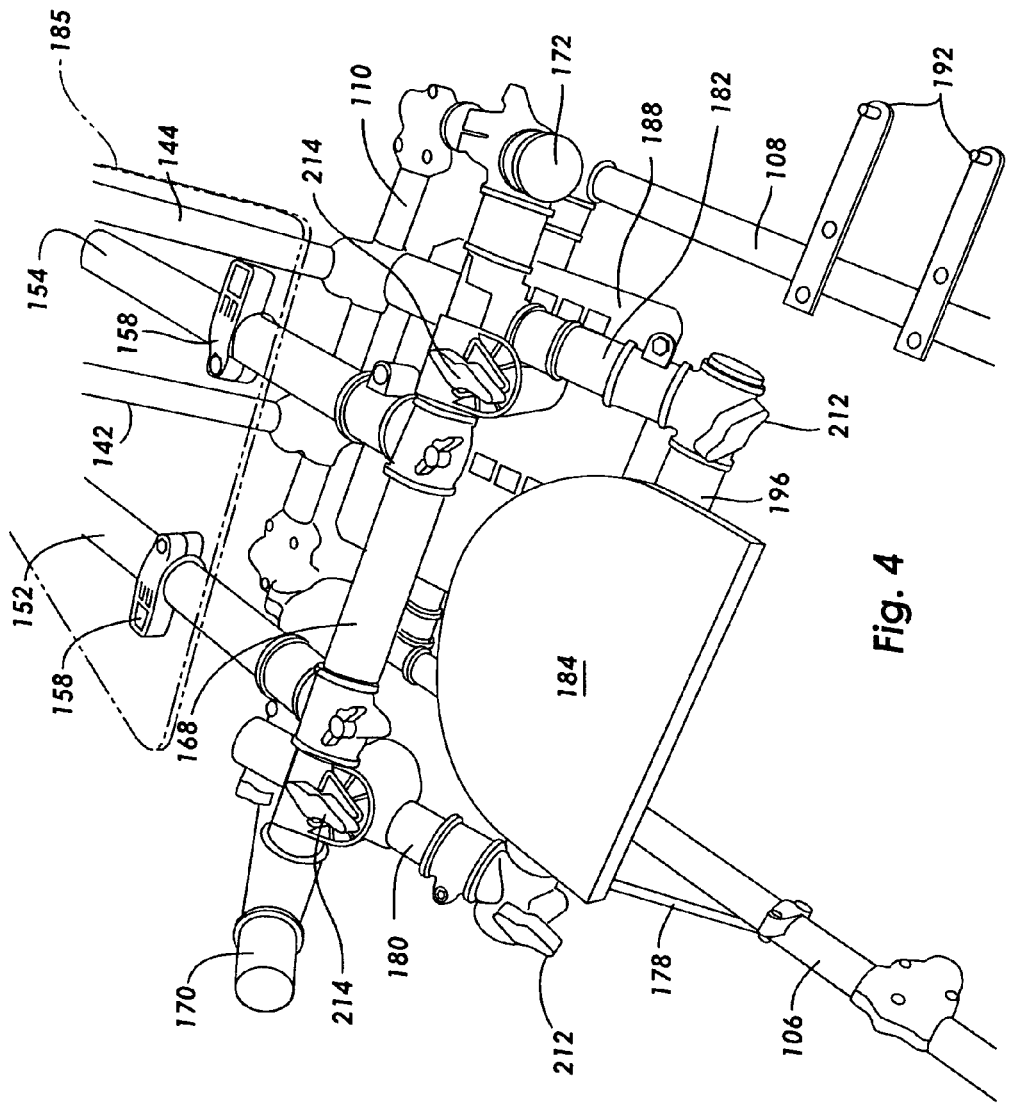
FIG. 4 is a top perspective view of the controller mount of FIG. 3.
Figure 6:
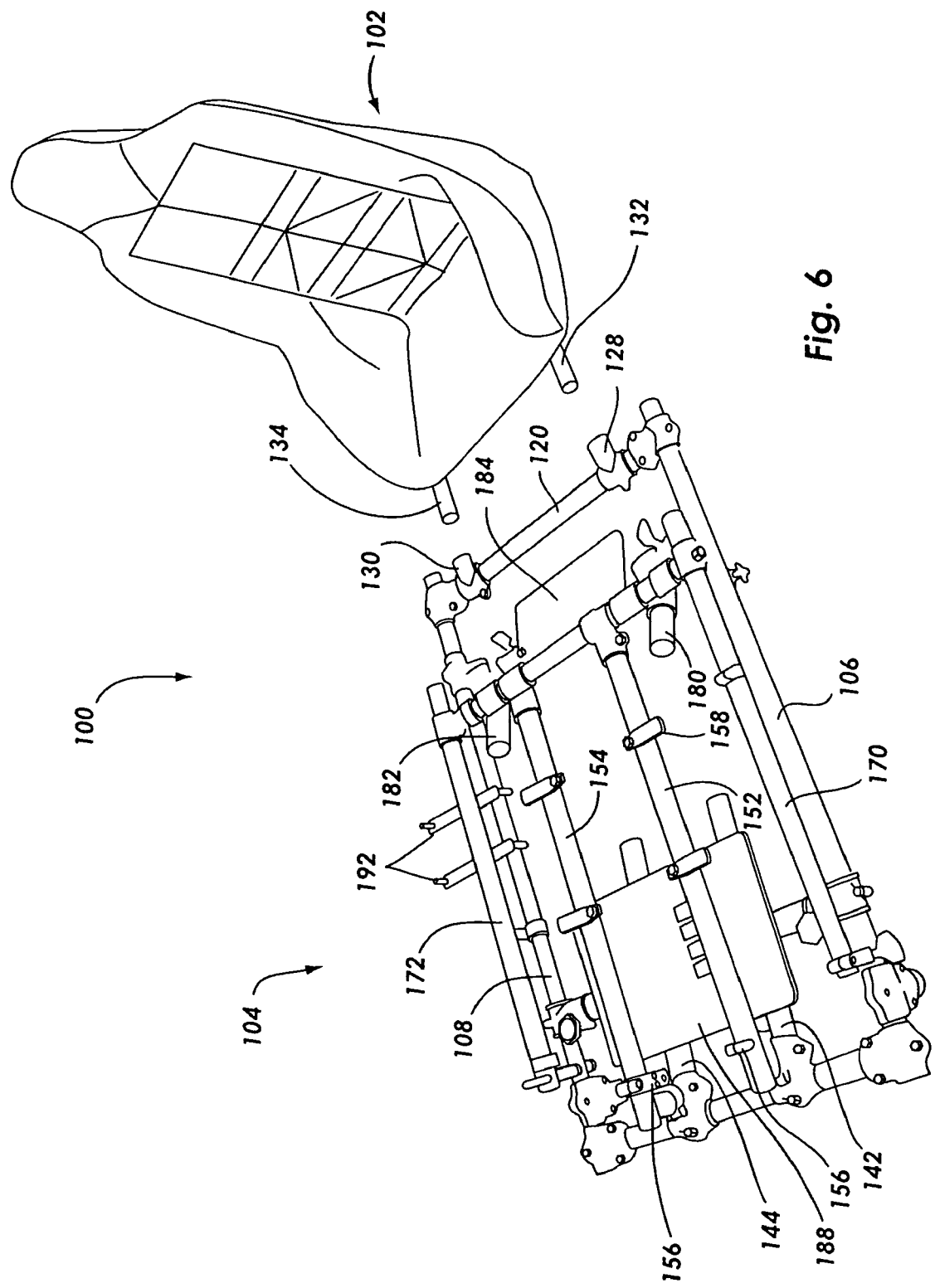
FIG. 6 is a perspective view of the video game cockpit assembly of FIG. 1 showing a chair detached from a support apparatus and the support apparatus collapsed to a low profile configuration.

Also mounted to the second cross-member 168 are first and second control mount members 180, 182 (see FIGS. 4 and 6 for element 182). The first and second control mount members 180, 182 support an adjustable control mount or platform 184 shown and discussed in more detail below with reference to FIGS. 3-4. As shown in FIG. 1, the adjustable control platform 184 supports a controller, such as a steering wheel 186, for example, used for manipulating a racing game.

According to some embodiments of the present invention, including the embodiment shown in FIG. 1, the support apparatus 104 includes a video game console mount 192. The video game console mount 192 is shown attached to the second side member 108 for convenient access by a user. However, the video game console mount 192 may be secured to other components of the support apparatus including, but not limited to: the first side member 106, one of the third and fourth angled members 170, 172, or one of the first and second upper members 152, 154. The video game console mount 192 is shown in more detail in FIG. 4 and is designed to hold any video game console, including the platforms mentioned above. As shown in FIG. 1, the video game console mount 192 supports a Playstaton 2® console 194.

The video game cockpit 100 as shown and described above provides an optimal environment for playing video games. It provides a chair 102, a monitor stand including pads 158 to support a game monitor or monitor platform 185 (FIG. 4), an adjustable controller platform 184 for the steering wheel 186 or other controller, an adjustable pedal platform 188 for the pedal module 190, and a video game console mount 192 for the video game console 194. In addition, the video game cockpit 100 is separable and collapsible for storage and portability.

Figure 2:
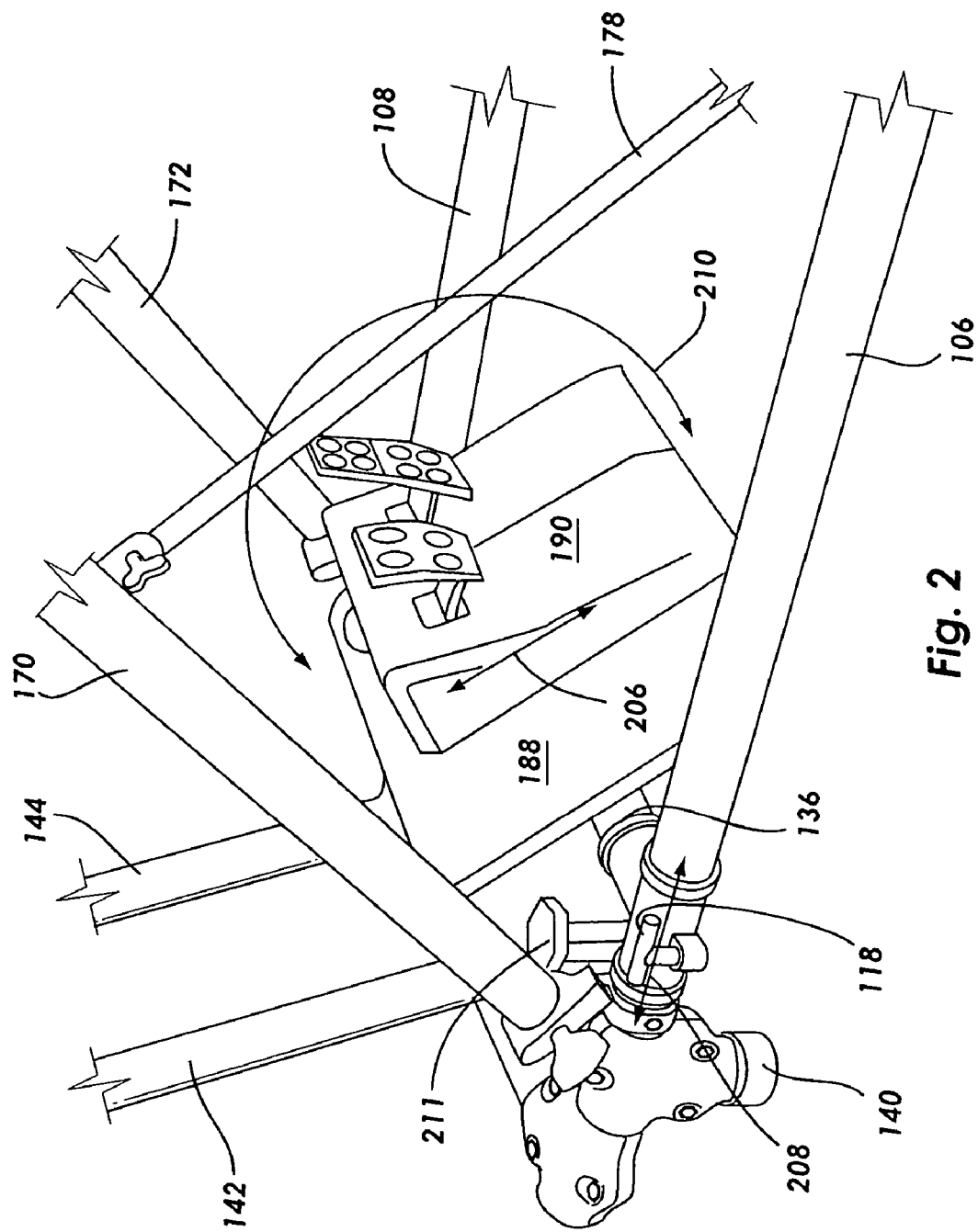
FIG. 2 is an enlarged perspective view of a pedal mount of the video game cockpit assembly of FIG. 1.

Referring next to FIG. 2, a detail of the adjustable pedal platform 188 is shown according to one embodiment of the present invention. The adjustable pedal platform 188 provides at least three degrees of freedom for the pedal module 190. The at least three degrees of freedom include a first degree of freedom along the plane of the adjustable pedal platform 188, which is represented by a first arrow 206. The pedal module 190 may attach in any of a number of positions to the pedal platform 188 as indicated by the first arrow 206. A second degree of freedom is represented by a second arrow 208 indicating adjustability of the pedal platform toward and away from a user along the first and second side members 106, 108. The adjustor 118 (and a similar adjustor on an opposite side) connecting the second nose cross-member 136 may be loosened, which allows the second nose cross-member 136 and thus the adjustable pedal platform 188 to translate forward and backward along the first and second side members 106, 108. When a convenient position for a user is reached, the adjustor 118 is tightened, securing the adjustable pedal platform 188 in place along the first and second side members 106, 108. A third degree of freedom for the adjustable pedal platform is represented by a third arc 210. The adjustable pedal platform 188 may rotate about the second nose cross-member 136 by loosening another adjustor 211 (and there may be a similar or identical adjustor 211 on an opposing side) that permits the second nose cross-member 136 and thus the adjustable pedal platform 188 to rotate. When a desirable angled orientation of the adjustable pedal platform 188 is achieved, the adjustor 211 is tightened and the adjustable pedal platform 188 is secured in place rotationally. Therefore, the adjustable pedal platform 188 is four-way adjustable about two degrees of freedom: forward and backward along the first and second side members 106, 108 and rotationally forward and backward about the second nose cross-member 136. The pedal module 190 is adjustable in two additional directions as well: up and down along the plane of the platform 188. The adjustability of the pedal platform 188 allows users of all sizes to use the video game cockpit with ease.

Similar to the adjustability of the adjustable pedal platform 188, the adjustable controller platform 184 shown in FIGS. 3-4 is six-way adjustable about at least three degrees of freedom. FIG. 3 illustrates in a side view the different modes of adjustability. A first arrow 198 illustrates a first degree of freedom, generally in the vertical direction, which allows the adjustable control platform 184 and thus the steering wheel 186 to be raised and lowered (this adjustment is accomplished by manipulating couplings 214 illustrated in FIG. 4 below). Generally the adjustable control platform 184 is raised and lowered by adjusting the placement of the connection of the braces 178 to the third and fourth angled members 170, 172 and/or the first and second side members 106, 108 (FIG. 1), which will also adjust the monitor stand height. A second degree of freedom is represented by a second arc 200. The adjustable control platform 184 may rotate through approximately 180 degrees according to the present embodiment by adjusting a pair of couplings 212 shown in FIG. 4 (the steering wheel 186 has been removed for clarity). The adjustable control platform 184 rotates about a control platform pivot member 196 when the couplings 212 are loosened. Accordingly, any desired rotational orientation may be accomplished by loosening the pair of couplings 212, rotating the adjustable control platform 184 to a desired orientation, and then tightening the pair of couplings 212 to secure the adjustable control platform 184 rotationally. A third degree of freedom is represented by a third arrow 202 (FIG. 3). The adjustable control platform 184 may translate toward and away from a user along the first and second control mount members 180, 182 (FIG. 4) by loosening a second pair of couplings 214 (FIG. 4). The adjustable control platform 184 is secured along the first and second control mount members 180, 182 (FIG. 4) by retightening the second pair of couplings 214 (FIG. 4) at a desired position.

As shown in FIG. 4, according to some embodiments the pads 158 may support a monitor platform or stand 185 as opposed to directly supporting a monitor. Accordingly, the platform 185 is shown in phantom and may taper toward the front of the video game cockpit.

Figure 5:
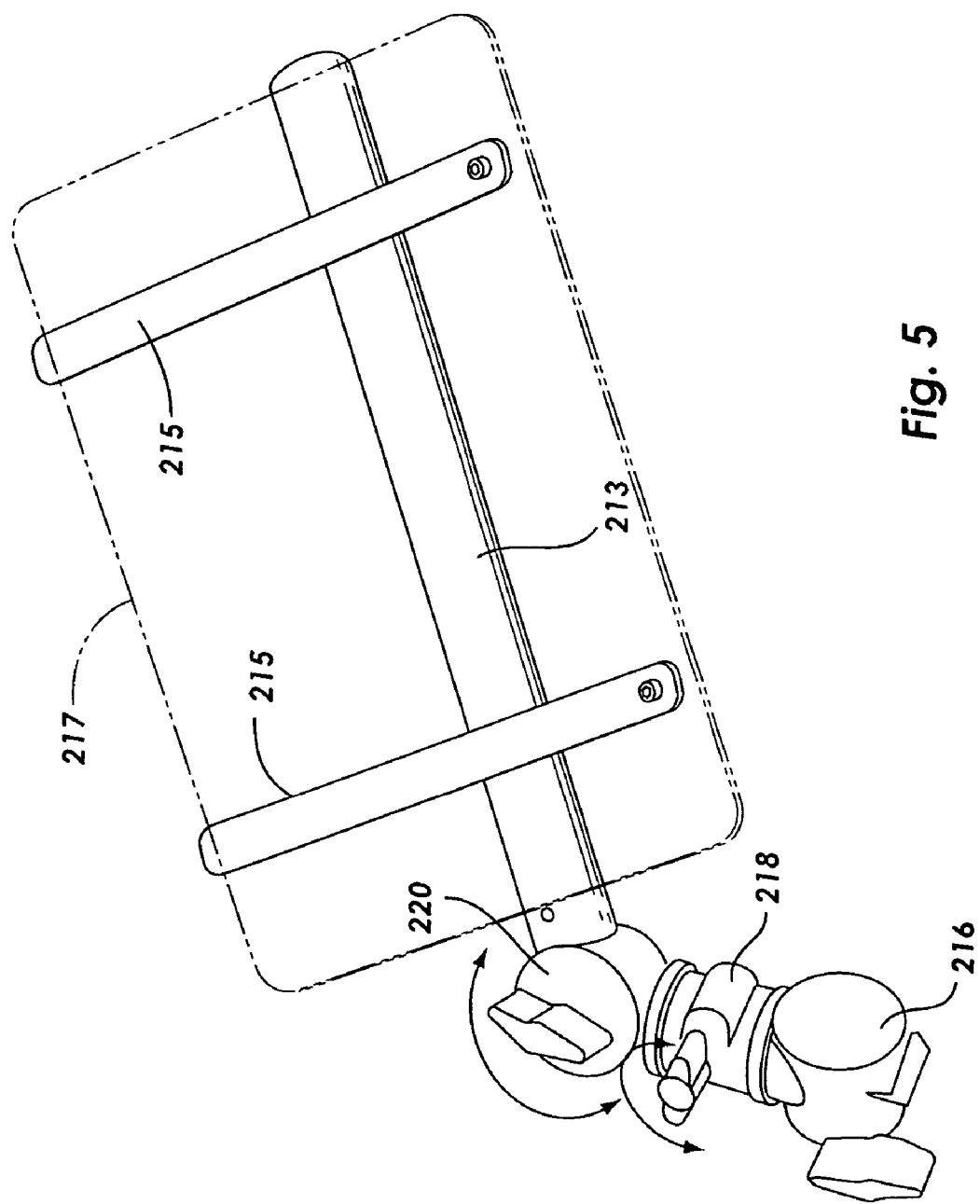
FIG. 5 is a perspective view of a keyboard mounting arm used with the video game cockpit assembly according to one embodiment of the present invention.

Although some of the embodiments shown illustrate the video game console mounts 192 supporting a PLAYSTATION 2 console, the mounts 192 as shown in FIG. 4 may hold other game platforms or a personal computer. Therefore, for embodiments wherein a personal computer is used, there may be a keyboard mounting arm 212 (FIG. 5) coupled to the support apparatus 104 (FIG. 1). Referring to FIG. 5, the keyboard mounting arm 213 may hold a computer keyboard and is adjustable in several directions. The keyboard mounting arm 213 may include two keyboard mounts 215 and a plurality of adjustors. For example, the keyboard mounting arm 213 shown includes a first mount 216 that may be attached, for example, to an end of the fourth angled member 172 (FIG. 4). Second and third adjustors 218, 220 may be loosened and tightened to facilitate positioning the keyboard mounting arm 213 in any convenient position so that a user has easy access to the computer keyboard and/or a computer mouse. According to some embodiments, the keyboard mounts 215 may support a keyboard platform 217 to accommodate a keyboard and/or a mouse and mouse pad of any shape or size.

As mentioned above, the video game cockpit 100 is adjustable for users of all sizes. In addition, the video game cockpit 100 is collapsible for storage and portability. Referring next to FIG. 6, the video game cockpit 100 is shown with the support apparatus 104 and the chair 102 separated, and with the support apparatus 104 collapsed to a low profile. The chair 102 is separated from the support apparatus 104 by loosening the first and second chair couplings 128, 130 and removing the first and second chair support members 132, 134 therefrom.

To collapse the support apparatus 104 into the configuration shown in FIG. 6, the video game console 194 (FIG. 1), the steering wheel 186 (FIG. 1), and the pedal module 190 (FIG. 1) are preferably removed. The braces 178 (FIG. 1) are detached from either the first and second side members 106, 108 or the third and fourth angled members 170, 172. In addition, the pivoting mounts 156 between the first and second angled members 142, 144 or the first and second upper members 152, 154 are removed. Accordingly, the first and second angled members 142, 144 fold in and under the adjustable pedal platform 188, the third and fourth angled members 170, 172 collapse down onto the first and second side members 106, 108, and the first and second upper members 152, 154 collapse down onto the adjustable pedal platform 188. Consequently, the entire support apparatus 104 collapses to a much lower profile of no more than 12 inches high, preferably only about 10 inches high or less. If used, the arm attachment 212 (FIG. 5) is usually removed from the support apparatus 104 prior to collapse.

While the invention has been particularly shown and described with reference to embodiments thereof, it will be understood by those skilled in the art that various other changes in the form and details may be made without departing from the scope of the invention.

What is claimed is:

1. A portable video game cockpit, comprising:
   first and second side members spaced from one another;
   a first nose cross-member attached transversely between first ends of the first and second side members;
   a chair cross-member attached transversely between second ends of the first and second side members;
   a second nose member attached transversely between the first and second side members at a spacing between the first nose cross-member and the chair cross-member;
   a chair removably attached to the chair cross-member;
   first and second angled members attached to and extending upward from the first nose cross-member at first ends thereof;
   a first upper member removably attached at a first end to a second end of the first angled member and a second upper member removably attached at a first end to a second end of the second angled member, the first and second upper members extending in a direction toward the chair;
   a third angled member attached to the first end of the first side member and a fourth angled member attached to the first end of the second side member, the third and fourth angled members extending in a direction toward the chair;
   a second cross member attached to second ends of the third and fourth angled members, and also attached to second ends of the first and second upper members, wherein the cockpit is configured to collapse from a non-collapsed position to a collapsed position when the chair is detached from the chair cross-member and the first and second angled members are detached from the first and second upper members, the collapsed position having a vertical height of no more than twelve inches;
   a controller platform coupled to the portable video cockpit;
   a monitor stand coupled to the portable video cockpit; and
   a pedal platform coupled to the portable video cockpit.

2. A portable video game cockpit according to claim 1, further comprising:
   a first brace attached to the second end of the first side member and extending to an attachment point between the first and second ends of the third angled member;
   a second brace attached to a second end of the second side member and extending to an attachment point between the first and second ends of the fourth angled member.

3. A portable video game cockpit according to claim 1, further comprising:
   a first non-tubular rod attached to the second end of the first side member and extending to an attachment point between the first and second ends of the third angled member;
   a second non-tubular rod attached to a second end of the second side member and extending to an attachment point between the first and second ends of the fourth angled member.

4. A portable video game cockpit according to claim 1, further comprising a controller member attached to the second cross member.

5. A portable video game cockpit according to claim 1, further comprising a controller member attached to the second cross member, the controller member further comprising the controller platform, wherein the controller platform is adjustable with the controller member according to 3 degrees of freedom.

6. A portable video game cockpit according to claim 1 wherein the monitor stand comprise a plurality of mounting pads for supporting a video game monitor.

7. A portable video game cockpit according to claim 1 wherein the first and second upper members are substantially horizontal and parallel to one another, with a spacing therebetween less than the spacing between the first and second side members.

8. A portable video game cockpit according to claim 1 wherein the first and second side members, the first nose cross-member, the chair cross-member, the second nose member, the first and second angled members, the first and second upper members, the third and fourth angled members, and the second cross member each comprise tubulars.

9. A portable video game cockpit according to claim 1 wherein attachments between the members each comprise adjustable couplers receptive of the members.

10. A portable video game cockpit according to claim 1 wherein the second nose member supports the pedal platform, the pedal platform being adjustable with the second nose member according to two degrees of freedom.

11. A portable video game cockpit according to claim 1 wherein the controller platform is adjustable in three degrees of freedom.

12. A portable video game cockpit according to claim 1 wherein the controller platform is adjustable in at least an up and down direction.

13. A portable video game cockpit according to claim 1 wherein the controller platform is adapted to receive a steering wheel.

14. A portable video game cockpit according to claim 1 further comprising a game console mount coupled to the portable video game cockpit the game console mount being receptive of a plurality of computer game consoles.

15. A portable video game cockpit according to claim 1 further comprising a keyboard mounting arm coupled to the portable video game cockpit.

16. A portable video game cockpit according to claim 1 wherein the pedal platform comprises at least two degrees of freedom.

17. A portable video game cockpit according to claim 16 wherein the pedal platform is adjustable forward and backward and rotational about an axis.

18. A portable video game cockpit according to claim 1 further comprising at least one pedal mountable to the pedal platform in a plurality of positions along a plane defining the pedal platform.

19. A portable video game cockpit according to claim 1 wherein the monitor stand is adjustable relative to the portable video game cockpit.

20. A portable video game cockpit according to claim 1 further comprising a video game console mount coupled to the portable video game cockpit and adapted to receive a video game console.

* * * * *